United States Patent
Ikeda et al.

(10) Patent No.: US 11,093,786 B2
(45) Date of Patent: Aug. 17, 2021

(54) EXTRANEOUS-MATTER DETECTING APPARATUS AND EXTRANEOUS-MATTER DETECTING METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 134 days.

(21) Appl. No.: 16/567,070

(22) Filed: Sep. 11, 2019

(65) Prior Publication Data

US 2020/0210749 A1    Jul. 2, 2020

(30) Foreign Application Priority Data

Dec. 28, 2018    (JP) ............... JP2018-248532

(51) Int. Cl.
| | |
|---|---|
| *G06K 9/46* | (2006.01) |
| *G06K 9/00* | (2006.01) |
| *G05D 1/02* | (2020.01) |
| *G06K 9/32* | (2006.01) |

(52) U.S. Cl.
CPC ......... *G06K 9/4647* (2013.01); *G05D 1/0223* (2013.01); *G06K 9/00791* (2013.01); *G06K 9/3233* (2013.01); *G06K 9/4661* (2013.01)

(58) Field of Classification Search
CPC ............. G06K 9/4647; G06K 9/00791; G06K 9/4661; G06K 9/3233; G05D 1/0223
See application file for complete search history.

(56) References Cited

U.S. PATENT DOCUMENTS

| | | | |
|---|---|---|---|
| 6,762,800 B1 * | 7/2004 | Nie ..................... | H04N 5/45 348/687 |
| 2014/0010408 A1 * | 1/2014 | Irie ..................... | G06T 7/0002 382/103 |
| 2014/0029008 A1 * | 1/2014 | Hirai ................... | G01N 21/552 356/445 |

FOREIGN PATENT DOCUMENTS

| | | | |
|---|---|---|---|
| JP | 4071527 B2 * | 4/2008 | |
| JP | 2014-030188 A | 2/2014 | |
| JP | 2018-071994 A | 5/2018 | |
| JP | 2018-191087 A | 11/2018 | |

* cited by examiner

*Primary Examiner* — Edward F Urban
*Assistant Examiner* — Wassim Mahrouka
(74) *Attorney, Agent, or Firm* — Oliff PLC (57) ABSTRACT

An extraneous-matter detecting apparatus according to an embodiment includes a region setting unit, a computing unit, and a state setting unit. The region setting unit sets, for a captured image captured by an image capturing device provided in a vehicle, a plurality of divided regions. The computing unit computes a representative value of luminance in a target region for detecting an adhesion of an extraneous matter. The target region includes the plurality of divided regions. The state setting unit sets, based on a vehicle speed and the representative value of luminance in the target region, a transition state of information that indicates an adhesion state of an extraneous matter in the divided region.

7 Claims, 5 Drawing Sheets

EXTRANEOUS-MATTER DETECTING APPARATUS AND EXTRANEOUS-MATTER DETECTING METHOD

CROSS-REFERENCE TO RELATED APPLICATION

This application is based upon and claims the benefit of priority of the prior Japanese Patent Application No. 2018-248532, filed on Dec. 28, 2018, the entire contents of which are incorporated herein by reference.

FIELD

The embodiment discussed herein is directed to an extraneous-matter detecting apparatus and an extraneous-matter detecting method.

BACKGROUND

Conventionally, there has been known an extraneous-matter detecting apparatus that detects an extraneous matter having adhered to a lens on the basis of a time-series change in a luminance value of a divided region in a captured image (see, for example, Japanese Laid-open Patent Publication No. 2014-030188).

However, in the conventional technology, when an adhesion determination of an extraneous matter to a lens of a camera provided in a vehicle is executed, there presents possibility that the adhesion determination is not precisely executed depending on a traveling state of the vehicle, so as to execute an erroneous determination.

For example, when a vehicle is travelling on a dark road in a tunnel and the like, the luminance of a captured image temporarily becomes low, and thus there presents possibility that adhesion of an extraneous matter is determined even in a region to which an extraneous matter has not adhered.

SUMMARY

An extraneous-matter detecting apparatus according to an embodiment includes a region setting unit, a computing unit, and a state setting unit. The region setting unit sets, for a captured image captured by an image capturing device provided in a vehicle, a plurality of divided regions. The computing unit computes a representative value of luminance in a target region for detecting an adhesion of an extraneous matter. The target region includes the plurality of divided regions. The state setting unit sets, based on a vehicle speed and the representative value of luminance in the target region, a transition state of information that indicates an adhesion state of an extraneous matter in the divided region.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF EMBODIMENTS

Hereinafter, an embodiment of an extraneous-matter detecting apparatus and an extraneous-matter detecting method according to the present application will be described in detail with reference to the accompanying drawings. The present disclosure is not limited to the embodiment described in the following.

Figure 1:
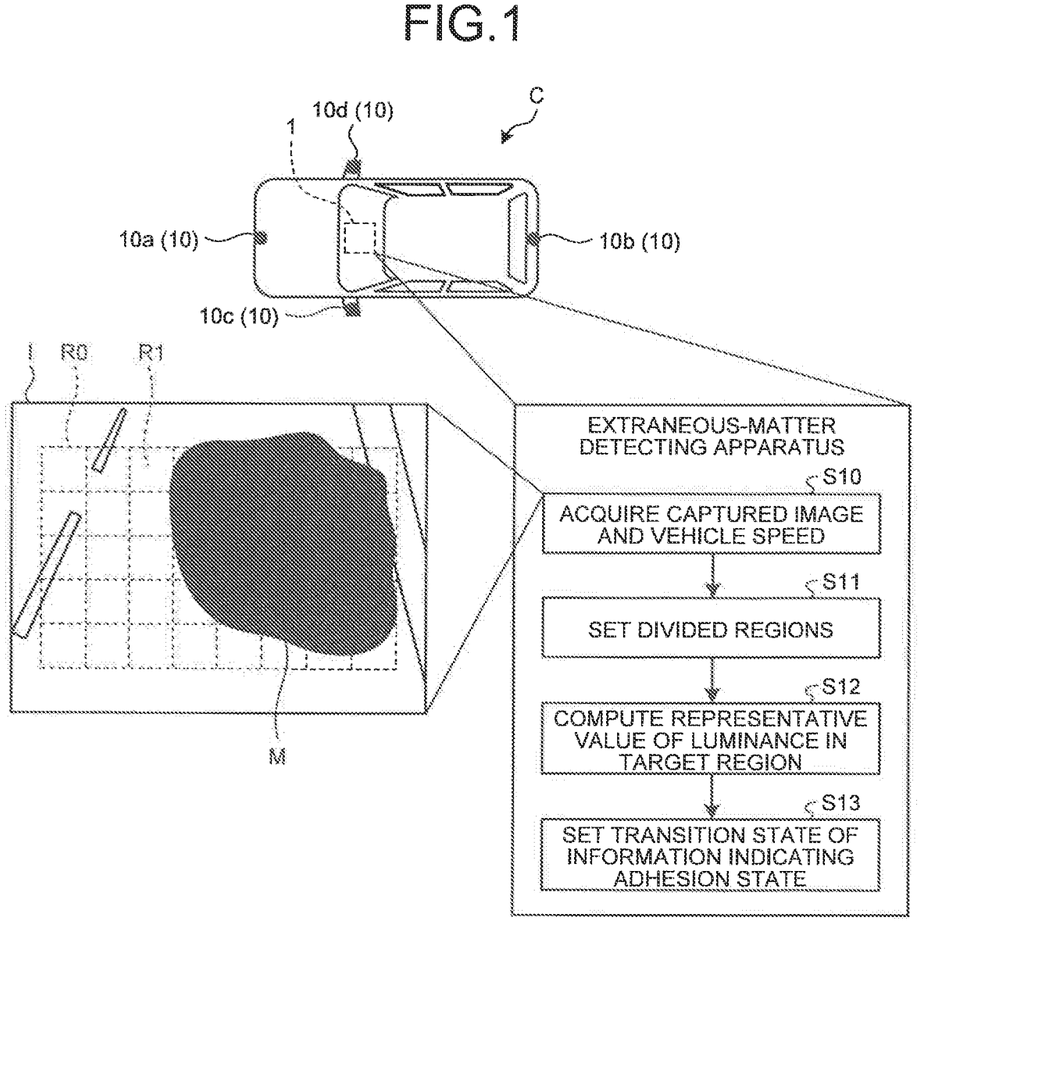
FIG. 1 is a diagram illustrating the outline of an extraneous-matter detecting method.

The outline of the extraneous-matter detecting method according to the embodiment will be explained with reference to FIG. 1. FIG. 1 is a diagram illustrating the outline of the extraneous-matter detecting method. The extraneous-matter detecting method according to the embodiment is executed by an extraneous-matter detecting apparatus 1.

The extraneous-matter detecting apparatus 1 is provided in a vehicle C, for example, and detects adhesion of an extraneous matter to an on-vehicle camera 10 (image capturing device) that captures the periphery of the vehicle C, specifically, adhesion of an extraneous matter M to a lens of the on-vehicle camera 10.

The on-vehicle camera 10 captures the periphery of the vehicle C. The on-vehicle camera 10 includes image capturing elements such as a Charge Coupled Device (CCD) and a Complementary Metal Oxide Semiconductor (CMOS). The on-vehicle camera 10 includes, for example, a front camera 10a that captures the front of the vehicle C, a rear camera 10b that captures the rear of the vehicle C, a left camera 10c that captures the left of the vehicle C, and a right camera 10d that captures the right of the vehicle C.

When a light-blocking extraneous matter M, such as mud and dust, has adhered to a lens of the on-vehicle camera 10, information on the periphery of the vehicle C, for example, information on a parking-frame, another vehicle, and a person, is not acquired from a captured image I obtained by the on-vehicle camera 10, so that there presents possibility that the parking-frame, the other vehicle, the person, etc. are not able to be precisely detected.

For example, when the vehicle C is travelling in a tunnel, the periphery of the vehicle C temporarily becomes dark, and thus the luminance of the captured image I temporarily becomes low. When a vehicle speed is high, the captured image I with blur is captured in some cases, when the vehicle speed low, a change in the background of the captured image I, in other words, a change in the luminance of the captured image I becomes small. When an adhesion determination of the extraneous matter M is executed in such a state, there presents possibility of erroneous determination.

Thus, the extraneous-matter detecting apparatus 1 according to the embodiment is configured to set, in accordance with a traveling state of the vehicle C, a transition state of information indicating an adhesion state of the extraneous matter M, so as to prevent erroneous determination of the extraneous matter M.

The information indicating the adhesion state of the extraneous matter M includes a counter value indicating adhesion continuity of the extraneous matter M, an extraneous-matter detecting flag indicating adhesion of the extraneous matter M to a lens of the on-vehicle camera 10, and the captured image I.

The extraneous-matter detecting apparatus 1 acquires the captured image I, which is captured by the on-vehicle camera 10, and a vehicle speed (Step S10).

The extraneous-matter detecting apparatus 1 sets a plurality of divided regions R1 in a target region R0 for detecting adhesion of the extraneous matter M (Step S11). The target region R0 is a region that is previously set in the captured image I, and is a region in which a process using the captured image I, such as a process for detecting the parking-frame and a self-parking process, is not able to be precisely executed when the extraneous matter M has adhered to a lens. The target region R0 is a rectangular region, for example.

The divided regions R1 are regions formed by dividing the target region R0 in a longitudinal direction and a lateral direction. Each of the divided regions R1 includes a plurality of pixels. For example, the divided region R1 is a rectangular region that includes 40×40 pixels.

In the captured image I illustrated in FIG. 1, the forty divided regions R1 are illustrated as one example, which are obtained by longitudinally dividing the target region R0 into five portions and further laterally dividing the target region R0 into eight portions; however, not limited thereto.

The extraneous-matter detecting apparatus 1 computes a representative value of the luminance in the target region R0 (Step S12). Specifically, the representative value is an average value.

The extraneous-matter detecting apparatus 1 sets, on the basis of a vehicle speed and a representative value of the luminance in the target region R0, a transition state of information indicating an adhesion state of the extraneous matter M in the divided region R1 (Step S13). The extraneous-matter detecting apparatus 1 sets a transition state on the basis of a vehicle speed and an average value of the luminance in the target region R0. Details will be mentioned later, the extraneous-matter detecting apparatus 1 sets, on the basis of a vehicle speed and a representative value of the luminance in the target region R0, a transition state to one of first to fifth states.

Thus, the extraneous-matter detecting apparatus 1 is capable of controlling information indicating an adhesion state of the extraneous matter M in accordance with a traveling state of the vehicle C to be able to prevent an erroneous determination of the extraneous matter M.

Figure 2:
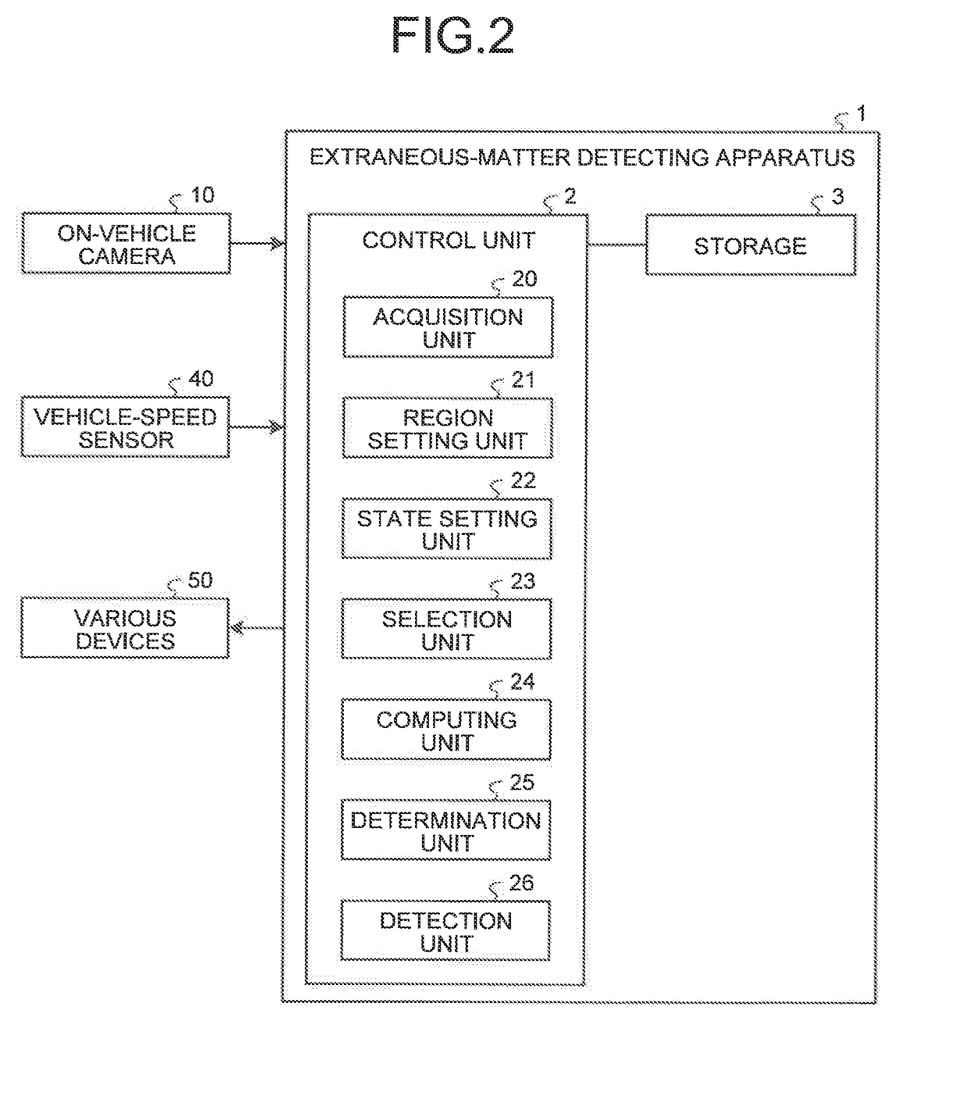
FIG. 2 is a block diagram illustrating a configuration of an extraneous-matter detecting apparatus.

Next, the extraneous-matter detecting apparatus 1 will be explained with reference to FIG. 2, FIG. 2 is a block diagram illustrating a configuration of the extraneous-matter detecting apparatus 1.

The extraneous-matter detecting apparatus 1 is connected to the on-vehicle camera 10, a vehicle-speed sensor 40, and various devices 50. In FIG. 2, a case is exemplified in which the extraneous-matter detecting apparatus 1 is separately provided from the on-vehicle camera 10 and the various devices 50; however, not limited thereto, the extraneous-matter detecting apparatus 1 may be integrated with at least one of the on-vehicle camera 10 and the various devices 50.

Each of the various devices 50 is a device that acquires a detection result of the extraneous-matter detecting apparatus 1 to execute various controls on the vehicle C. The various devices 50 include, for example, a display, a removal device, and a vehicle controller. The display informs of adhesion of the extraneous matter M to a lens of the on-vehicle camera 10 and a wiping-away instruction of the extraneous matter M by a user. The removal device ejects fluid, gas, and the like toward a lens so as to remove the extraneous matter M. The vehicle controller controls autonomous driving and the like.

The extraneous-matter detecting apparatus 1 includes a control unit 2 and a storage 3. The control unit 2 includes an acquisition unit 20, a region setting unit 21, a state setting unit 22, a selection unit 23, a computing unit 24, a determination unit 25, and a detection unit 26.

The extraneous-matter detecting apparatus 1 includes a computer that includes, for example, a Central Processing Unit (CPU), a Read Only Memory (ROM), a Random Access Memory (RAM), a data flash, and an input/output port; and various circuits.

The CPU of the computer reads and executes, for example, a program stored in the ROM so as to function as the acquisition unit 20, the region setting unit 21, the state setting unit 22, the selection unit 23, the computing unit 24, the determination unit 25, and the detection unit 26 of the control unit 2.

At least one or all of the acquisition unit 20, the region setting unit 21, the state setting unit 22, the selection unit 23, the computing unit 24, the determination. unit 25, and the detection unit 26 of the control unit 2 may be constituted of hardware such as an Application Specific Integrated Circuit (ASIC) and a Field Programmable Gate Array (FPGA). Any of the acquisition unit 20, the region setting unit 21, the state setting unit 22, the selection unit 23, the computing unit 24, the determination unit 25, and the detection unit 26 may be integrated with each other or may be divided into a plurality of parts.

The acquisition unit 20 acquires a vehicle speed on the basis of a signal transmitted from the vehicle-speed sensor 40. The acquisition unit 20 acquires an image that is captured by the on-vehicle camera 10, and generates the captured image I. Specifically, the acquisition unit 20 executes a gray-scaling process for converting each pixel in the acquired image into a corresponding gradation from white to black in accordance with its luminance. The acquisition unit 20 executes a pixel thinning process on the acquired image so as to generate an image having a smaller size than that of the acquired image.

The acquisition unit 20 generates, on the basis of the image on which the thinning process has executed, the captured image I including an integral image obtained by summing up pixel values of pixels and an integral image obtained by summing up squares of pixel values of the pixels. The pixel value indicates information corresponding to the luminance and the edge of a pixel. As described above, the extraneous-matter detecting apparatus 1 executes the thinning process on the acquired image and generates an integral image to be able to speed up calculations in the following processes, so that it is possible to shorten a processing time interval for detecting the extraneous matter M.

Note that the acquisition unit 20 may execute, on the pixels, a smoothing process by using a smoothing filter such as an averaging filter. The acquisition unit 20 may generate (acquire), without executing the thinning process, the captured image I having a size that is the same as that of the acquired image.

The region setting unit 21 sets, for the captured image I, the target region R0 and the divided regions R1. The region setting unit 21 sets, for previously set positions in each of the captured images 1, the target region R0 and the divided regions R1.

Figure 3:
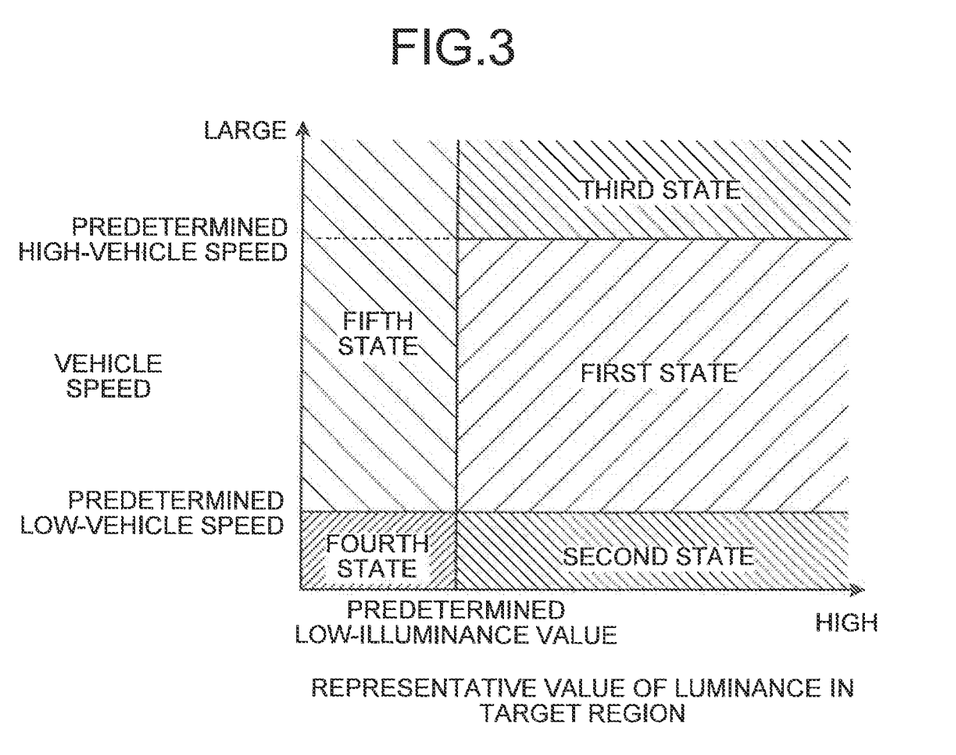
FIG. 3 is a diagram illustrating relation between an average value of luminance, a vehicle speed, and a transition state in a target region.

The state setting unit 22 sets, on the basis of a vehicle speed and a representative value of the luminance in the target region R0 that is computed by the computing unit 24 to be mentioned later, a transition state to a first state to a fifth state, as illustrated in FIG. 3. FIG. 3 is a diagram illustrating relation between a representative value of luminance, a vehicle speed, and a transition state in the target region R0.

Specifically, when a representative value of the luminance in the target region R0 is higher than a predetermined low-illuminance value, and a vehicle speed is equal to or larger than a predetermined low-vehicle speed and is equal to or less than a predetermined high-vehicle speed, the state setting unit 22 sets a transition state to the first state. In the first state, an adhesion determination of the extraneous matter M is executed. The predetermined low-illuminance value is a previously-set value and is a lower-limit value of a precise determination of adhesion of the extraneous matter M based on the captured image I. The predetermined low-illuminance value may be set in accordance with performance of the on-vehicle camera 10.

When a representative value of the luminance in the target region R0 is higher than the predetermined low illuminance value and a vehicle speed is smaller than the predetermined low-vehicle speed, the state setting unit 22 sets a transition state to the second state. In the second state, only a removal determination of the extraneous matter M is executed out of the adhesion determination of the extraneous matter M.

When a representative value of the luminance in the target region R0 is higher than the predetermined low-illuminance value and a vehicle speed is larger than the predetermined high-vehicle speed, the state setting unit 22 sets a transition state to the third state. In the third state, adhesion determination of the extraneous matter M is not executed.

When a representative value of the luminance in the target region R0 is equal to or less than the predetermined low-illuminance value and a vehicle speed is smaller than the predetermined low-vehicle speed, the state setting unit 22 sets a transition state to the fourth state. In the fourth state, adhesion determination of the extraneous matter M is not executed.

When a representative value of the luminance in the target region R0 is equal to or less than the predetermined low-illuminance value and a vehicle speed is equal to or more than the predetermined low-vehicle speed, the state setting unit 22 sets a transition state to the fifth state. In the fifth state, adhesion determination of the extraneous matter M is not executed.

Details of the first state to the fifth state of the transition state will be mentioned later.

Returning to FIG. 2, when executing an adhesion determination of the extraneous matter M, the selection unit 23 selects, from among the divided regions R1, the divided region R1 on which the determination of whether or not a predetermined condition is satisfied is not executed. The predetermined condition will be mentioned later.

The computing unit 24 detects the luminance of each pixel included in the target region R0 of the captured image I, and computes a representative value of the luminance and a dispersion amount of the luminance in the target region R0. The computing unit 24 computes a representative value of the luminance and a dispersion amount of the luminance in each of the divided regions R1. The representative value is a value that indicates a representative luminance in a distribution of the luminance in a target region, specifically, an average value is used. In addition to the average value, a trimmed mean, a median, a mode, or the like may be used. The dispersion amount is a value that indicates the spread of a distribution of the luminance in a target region, specifically, a standard deviation is used. In addition to the standard deviation, the dispersion, a maximum/minimum width, a quartile width, and an arbitrary percentile width may be used. Hereinafter, the case will be exemplified in which an average value is used as a representative value and a standard deviation is used as a dispersion amount.

When executing an adhesion determination of the extraneous matter M, the computing unit 24 computes a first difference and a second difference.

The first difference is a difference between (i) an average value of the luminance in the divided region R1 in the present captured image I (hereinafter, may be referred to as "present frame I1") and (ii) an average value of the luminance in the divided region R1 in the captured image I (hereinafter, may be referred to as "past frame I0") that has been acquired in a process prior to the present frame I1. In other words, the first difference is a difference between (i) an average value of the present luminance in a corresponding divided region R1 and (ii) an average value of the past luminance in the corresponding divided region R1. Note that the first difference is an absolute value.

The divided region R1 in the present frame I1 and the divided region R1 in the past frame I0, which are used in computing the first difference, are the divided region R1 having the same position with respect to the target region R0. Hereinafter, the divided region R1 may be referred to as the "same divided region R1".

The second difference is a difference between standard deviations of the luminance in the same divided region R1. In other words, the second difference is a difference between a standard deviation of the present luminance in the corresponding divided region R1 and a standard deviation of the past luminance in the corresponding divided region R1. Note that the second difference is an absolute value.

When a transition state is the first state, the past frame I0 is the captured image I that is acquired in a process just before the present frame I1.

When a transition state is changed from the first state into another state (second state to fifth state), the past frame I0 is the captured image just before the transition state is changed from the first state into the other state. Thus, when adhesion of the extraneous matter M has been detected and a transition state has changed from the first state into the other state, the captured image that has been captured in the first state and to which the extraneous matter M has adhered becomes the past frame I0.

When a transition state is changed from the first state into the second state, for example, a difference between (i) an average value of the luminance in the divided region R1 of the present frame I1 and (ii) an average value of the luminance in the divided region R1 of the past frame I0, specifically, the divided region R1 of the captured image I just before a transition state has changed from the first state into the second state, is computed as a first difference.

When a transition state is changed from the first state into the second state via any of the third state to the fifth state, similarly, for example, a difference between (i) an average value of the luminance in the divided region R1 of the present frame I1 and (ii) an average value of the luminance in the divided region R1 of the past frame I0, specifically, the divided region R1 of the captured image I just before the transition state has been changed from the first state into another state (third state to fifth state) is computed as a first difference.

When executing an adhesion determination of the extraneous matter M, the computing unit 24 computes a counter value in the divided region R1. Specifically, when determining that a transition state is the first state and the divided region R1 of the present frame I1 satisfies a predetermined condition, the computing unit 24 increases a present counter value. When determining that a transition state is the first state and the divided region R1 of the present frame I1 does not satisfy the predetermined condition, the computing unit 24 reduces the present counter value. In other words, when a transition state is the first state, the computing unit 24 increases/decreases a counter value in the divided region R1 so as to update the counter value.

When determining that a transition state is the second state and the divided region R1 of the present frame I1 satisfies a predetermined condition, the computing unit 24 holds a present counter value. When determining that a transition state is the second state and the divided region R1 of the present frame I1 does not satisfy the predetermined condition, the computing unit 24 reduces a present counter value. In other words, when a transition state is the second state, the computing unit 24 reduces a counter value of the divided region R1, but does not increase the counter value of the divided region R1.

The predetermined condition is satisfied when all of the following conditions are satisfied. A condition (1): a first difference is equal to or less than a first predetermined difference. A condition (2): a second difference is equal to or less than a second predetermined difference. A condition (3): an average value of the luminance in the divided region R1 is equal to or less than a first predetermined value. In other words, when at least one of the above-mentioned conditions (1) to (3) is not satisfied, the predetermined condition is not satisfied.

The first predetermined difference is an upper-limit difference of an average value of the luminance when the extraneous matter M has adhered, and is a difference that is previously set by an experiment and the like. The first predetermined difference is "5", for example. The second predetermined difference is an upper-limit difference of a standard deviation of the luminance when the extraneous matter M has adhered, and is a difference that is previously set by an experiment and the like. The second predetermined difference is "1", for example. The first predetermined value is a value by using which the extraneous matter M is able to be determined to adhere to the divided region R1, and a value that is set on the basis of an average value of the luminance in the target region R0 of the present frame I1, for example. The first predetermined value is larger as an average value of the luminance of the target region R0 is higher.

The counter value is increased when the divided region R1 is determined to satisfy a predetermined condition, and is reduced when the divided region R1 is determined not to satisfy the predetermined condition. The counter value indicates adhesion continuity of the extraneous matter M, in other words, continuity of determination that the divided region R1 satisfies the predetermined condition. An increased value and a reduced value of the counter value is a previously-set value, and is "1", for example.

A previously-set upper-limit counter value and a previously-set lower-limit counter value are set for the counter value. The increased value and the reduced value of a counter value for one determination may be different.

When an adhesion determination of the extraneous matter M is not executed and a transition state is the third state or the fourth state, the computing unit 24 holds a counter value.

When an adhesion determination of the extraneous matter M is not executed and a transition state is the fifth state, the computing unit 24 holds a counter value, or sets the counter value to a predetermined fixed value.

In the fifth state, when a counter value just before a transition state is changed into the fifth state is smaller than a predetermined fixed value, the computing unit 24 holds a counter value. In the fifth state, when the counter value just before a transition state is changed into the fifth state is larger than the predetermined fixed value, the computing unit 24 changes the counter value into the predetermined fixed value, and then holds the counter value at the predetermined fixed value.

The predetermined fixed value is a previously-set value, and is a value that is smaller than a predetermined counter value. The predetermined counter value is a previously-set value, and a threshold for determining that the extraneous matter M has adhered to the divided region R1. Specifically, the predetermined fixed value is a value obtained by subtracting, from a predetermined counter value, a value obtained by multiplying an increased value of a counter value by a predetermined process number. The predetermined process number is the number of processes for determining the divided region R1 to be an adhesion region when adhesion of the extraneous matter M is continuously detected.

For example, when a predetermined counter value is "20", an increased value is "1", and a predetermined process number is "3", a predetermined fixed value is "17". For example, a state where a counter value in the first state is "21" is changed into the fifth state, the counter value is changed into "17", and then when a transition state is the fifth state, the counter value is held at "17".

When executing an adhesion determination of the extraneous matter M, the computing unit 24 computes an occupancy that is a ratio of an adhesion region to the target region R0. The occupancy is computed by dividing a value obtained by totaling areas of adhesion regions, which are the divided regions R1 to which the extraneous matter M has adhered, by an area of the target region R0. The occupancy may be computed by dividing the number of the adhesion regions by the number of the divided regions R1 included in the target region R0. The occupancy is expressed as a percentage, for example.

The computing unit 24 excepts the divided regions R1 in which the own vehicle C appears from the captured image I in which the own vehicle C appears, so as to compute an occupancy.

The determination unit 25 determines whether or not a vehicle speed is equal to or more than the predetermined low-vehicle speed. When a vehicle speed is small, the present frame I1 and the past frame I0 become substantially the same captured image I, and a first difference of the luminance in the same divided region R1 becomes small, for example. Thus, a precise execution of an adhesion determination of the extraneous matter M is difficult. The predetermined low-vehicle speed is a previously-set vehicle speed, and a lower-limit value of a vehicle speed at which an adhesion determination of the extraneous matter M is able to be precisely executed. For example, the predetermined low-vehicle speed is 15 km/h.

The determination unit 25 determines whether or not a vehicle speed is equal to or less than the predetermined high-vehicle speed. The predetermined vehicle speed is a previously-set vehicle speed, and is larger than the predetermined low-vehicle speed. When a vehicle speed is large, blur of the captured image I is large, and thus a precise adhesion determination of the extraneous matter M becomes difficult. The predetermined high-vehicle speed is an upper-limit vehicle speed at which an erroneous determination of the extraneous matter M, which is due to blur of the captured image I, is able to be prevented when the on-vehicle camera 10 captures the captured image I For example, the predetermined high-vehicle speed is 80 km/h.

Note that the predetermined low-vehicle speed and the predetermined high-vehicle speed may be set in accordance with performance of the on-vehicle camera 10.

The determination unit 25 determines whether or not an average value of the luminance in the target region R0 is equal to or less than the predetermined low-illuminance value.

When executing an adhesion determination of the extraneous matter M, the determination unit 25 determines whether or not the predetermined condition is satisfied.

When executing an adhesion determination of the extraneous matter M, the determination unit 25 determines whether or not the divided region R1 is an adhesion region. Specifically, the determination unit 25 determines whether or not a counter value in the divided region R1 of the present frame I1 is equal to or more than a predetermined counter value.

When a counter value in the divided region R1 of the present frame I1 is equal to or more than a predetermined counter value, the determination unit 25 determines that the divided region R1 is an adhesion region to which the extraneous matter M has adhered. In other words, the determination unit 25 determines that the divided region R1, in which a state satisfying the predetermined condition continues, is an adhesion region. When a counter value in the divided region R1 of the present frame I1 is smaller than the predetermined counter value, the determination unit 25 determines that the divided region R1 is not an adhesion region but a non-adhesion region to which the extraneous matter M has not adhered.

Note that hysteresis may be set for the predetermined counter value. In other words, the predetermined counter value when a determination of the divided region R1 is changed from a non-adhesion region to an adhesion region may differ from the predetermined counter value when a determination of the divided region R1 is changed from an adhesion region to a non-adhesion region.

When executing an adhesion determination of the extraneous matter M, the determination unit 25 determines whether or not a determination has been executed, which determines, for all of the divided regions R1 in the present frame I1, whether or not a predetermined condition is satisfied.

When executing an adhesion determination of the extraneous matter M the determination unit 25 determines whether or not the extraneous matter M has adhered to a lens of the on-vehicle camera 10. Specifically, the determination unit 25 determines whether or not an occupancy is equal to or more than a predetermined occupancy. The predetermined occupancy is a previously-set value, and is "40%", for example. When an occupancy is equal to or more than the predetermined occupancy, the determination unit 25 determines that the extraneous matter M has adhered to a lens of the on-vehicle camera 10. When an occupancy is smaller than the predetermined occupancy, the determination unit 25 determines that the extraneous matter M has not adhered to a lens of the on-vehicle camera 10.

When executing an adhesion determination of the extraneous matter M, the detection unit 26 detects, as an adhesion region, the divided region R1 to which the extraneous matter M is determined to have adhered. When executing an adhesion determination of the extraneous matter M, the detection unit 26 detects, as a non-adhesion region, the divided region R1 to which the extraneous matter M is determined not to have adhered.

When determining that the extraneous matter M has adhered to a lens of the on-vehicle camera 10, the detection unit 26 detects adhesion of the extraneous matter M to the on-vehicle camera 10. Specifically, when determining that the extraneous matter M has adhered to a lens of the on-vehicle camera 10, the detection unit 26 turns "ON" an extraneous-matter detecting flag. When determining that the extraneous matter M has not adhered to the on-vehicle camera 10, the detection unit 26 turns "OFF" the extraneous-matter detecting flag. When a transition state is the third state, the detection unit 26 holds the extraneous-matter detecting flag. In a case where a transition state is the fourth state or the fifth state, the detection unit 26 turns "OFF" the extraneous-matter detecting flag.

When a transition state is the fourth state or the fifth state, the detection unit 26 turns "ON" a low-illuminance flag, and when a transition state is any of the first state to the third state, the detection unit 26 turns "OFF" the low-illuminance flag.

The storage 3 corresponds to a RAM and/or a data flash, for example. The RAM and the data flash are capable of storing therein information on various programs, the past frame I0, and threshold information on average values of the luminance in the divided regions R1, standard deviations of the luminance in the divided regions R1, counter values of the divided regions R1, the predetermined low-illuminance value, etc. Note that the extraneous-matter detecting apparatus 1 may acquire the above-mentioned programs and the various kinds of information via another computer connected thereto via a wired/wireless network or a portable recording medium.

Next, the first state to the fifth state of a transition state will be explained.

In the first state, an average value of the luminance in the target region R0 is larger than the predetermined low-illuminance value, a vehicle speed is equal to or more than the predetermined low-vehicle speed, and the vehicle speed is equal to or less than the predetermined high-vehicle speed, adhesion of the extraneous matter M is able to be precisely determined. Thus, in the first state, an adhesion determination of the extraneous matter M is executed. Specifically, in the first state, a first difference, a second difference, and the like are computed in the divided region R1, and a counter value is increased/decreased to be updated. Next, whether or not the divided region R1 is an adhesion region is determined and detection of an adhesion region is executed. Next, whether or not an occupancy is equal to or more than a predetermined occupancy is determined, adhesion of the extraneous matter M is detected, and then the extraneous-matter detecting flag is turned "ON" or "OFF" in accordance with a detection result.

In the second state, an average value of the luminance in the target region R0 is equal to or more than the predetermined low-illuminance value, and a vehicle speed is smaller than the predetermined low-vehicle speed. Thus, a first difference and a second difference become small even when the extraneous matter M has not adhered, and thus a precise adhesion determination of the extraneous matter M becomes difficult. Therefore, in the second state, only a removal determination of an adhesion determination of the extraneous matter M is executed. In a case where the extraneous matter M is removed, for example, when the extraneous matter M has been wiped away, a first difference and a second difference become large before and after the wiping. Thus, it is possible to execute a removal determination of the extraneous matter M.

Specifically, in the second state, a first difference, a second difference, and the like are computed, and an adhesion determination is executed similarly to the first state. However, in the second state, a counter value is not increased even when a predetermined condition is satisfied, and only reducing the counter value is allowed when the predetermined condition is not satisfied. Thus, in the second state, the counter value is reduced to be updated or held. Although the extraneous-matter detecting flag turned from "ON" into "OFF" in some cases, however, the extraneous-matter detecting flag is not turned from "OFF" into "ON".

When the extraneous-matter detecting flag has been turned "ON" and a transition state is changed from the first state into the second state, the captured image I obtained in a process just before a process for changing a transition state into the second state is stored in the storage 3 as the past frame I0. In the second state, a first difference and a second difference are computed by using the present frame I1 and the past frame I0 that is obtained in a process just before a process for changing a transition state into the second state.

In the third state, an average value of the luminance in the target region R0 is equal to or more than the predetermined low-illuminance value, and a vehicle speed is larger than the predetermined high-vehicle speed. Therefore, blur of the captured image I becomes large, and thus a precise adhesion determination of the extraneous matter M is difficult. Thus, in the third state, an adhesion determination of the extraneous matter M is not executed, a counter value is held, and the extraneous-matter detecting flag is held.

When the extraneous-matter detecting flag has been turned "ON" and a transition state is changed from the first state into the third state, the captured image I obtained in a process just before a process for changing a transition state into the third state is stored in the storage 3 as the past frame I0.

In the fourth state, an average value of the luminance in the target region R0 is lower than the predetermined low-illuminance value, and thus the extraneous matter M is not able to be precisely detected in the captured image I. Thus, in the fourth state, an adhesion determination of the extraneous matter M is not executed, a counter value is held, the extraneous-matter detecting flag is turned "OFF", and the low-illuminance flag is turned "ON".

In the fourth state, a counter value is held because the extraneous-matter detecting flag is turned "ON" in an early stage, for example, when the on-vehicle camera 10 is covered by a hand and then the cover is removed, or when it becomes bright by a light of another vehicle at night, in a state where the extraneous matter M has adhered.

Thus, when the extraneous-matter detecting flag is turned "ON" and a transition state is temporarily changed from the first state or the second state into the fourth state and returns again to the first state or the second state, the extraneous matter M flag is able to be turned "ON" in an early stage.

When the extraneous-matter detecting flag has turned "ON" and a transition state is changed from the first state into the fourth state, the captured image I obtained in a process just before a process for changing a transition state into the fourth state is stored in the storage 3 as the past frame I0.

In the fifth state, an average value of the luminance in the target region R0 is lower than the predetermined low-illuminance value, and thus the extraneous matter M is not able to be precisely detected in the captured image I. Thus, in the fifth state, an adhesion determination of the extraneous matter M is not executed, and a counter value is hold or set to a predetermined fixed value. Furthermore, the extraneous-matter detecting flag is turned "OFF", and the low-illuminance flag is turned "ON".

In the fifth state, when a counter value just before a transition state is changed into the fifth state is smaller than a predetermined fixed value, the counter value is held.

In the fifth state, when a counter value just before a transition state is changed into the fifth state is larger than a predetermined fixed value, the counter value is changed into the predetermined fixed value, and then is held at the predetermined fixed value. Thus, it is possible to prevent the extraneous-matter detecting flag from repeatedly changing between "ON" and "OFF", for example, when the vehicle C is travelling in a tunnel, in a state where the extraneous matter M has adhered. Moreover, it is possible to turn "ON" the extraneous-matter detecting flag in an early stage, for example, when the vehicle C goes out of a tunnel, in a state where the extraneous matter M has adhered.

Furthermore, when the extraneous-matter detecting flag is turned ON and a transition state is changed from the first state into the fifth state, the captured image I obtained in a process just before a process for changing a transition state into the fifth state is stored in the storage 3 as the past frame I0.

Figure 4:
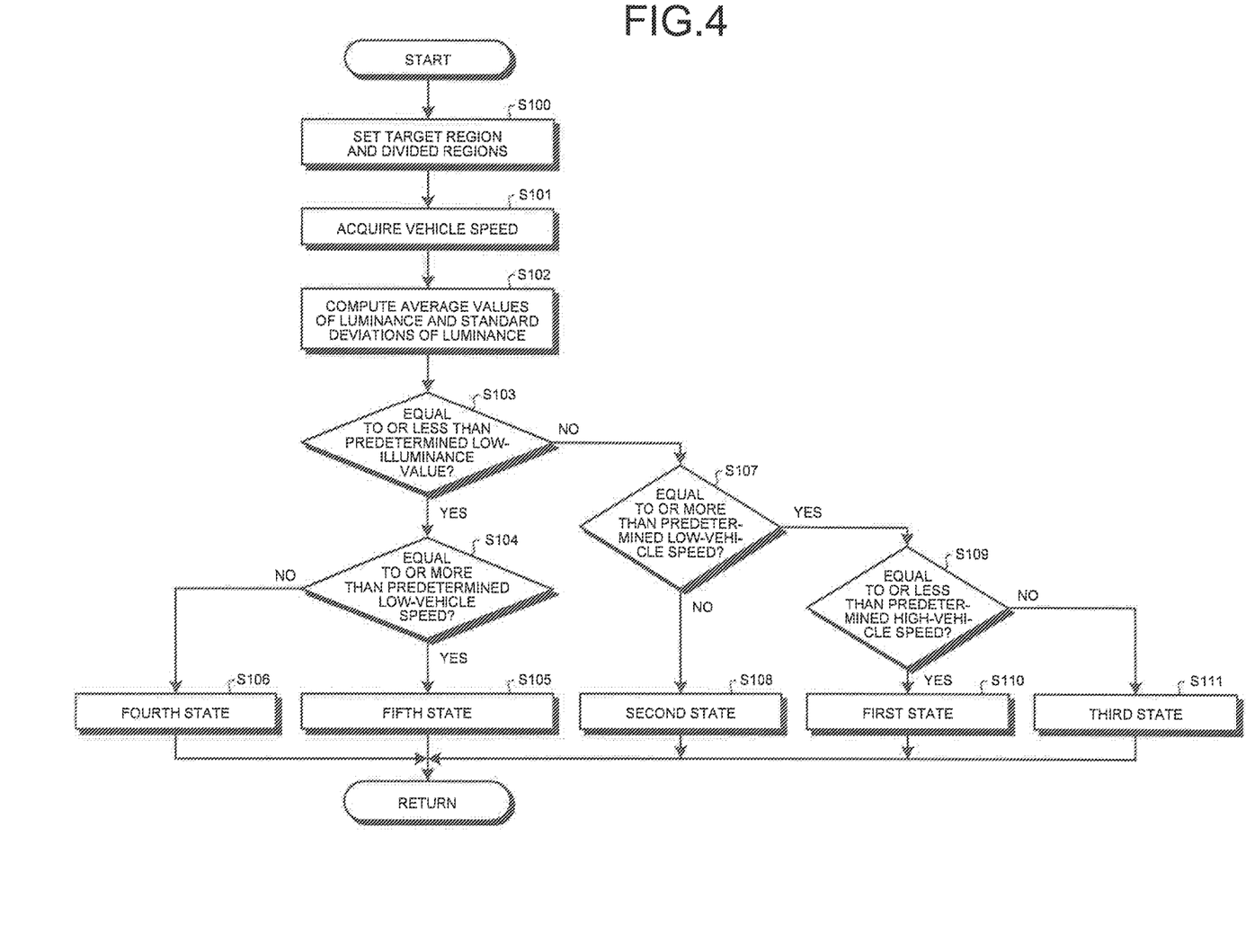
FIG. 4 is a flowchart illustrating a state setting process.

Next, a state setting process according to the embodiment will be explained with reference to FIG. 4. FIG. 4 is a flowchart illustrating the state setting process.

The extraneous-matter detecting apparatus 1 generates the present frame I1 from an image captured by the on-vehicle camera 10, sets the target region R0 and the divided regions R1 (Step S100), and acquires a vehicle speed (Step S101).

The extraneous-matter detecting apparatus 1 computes an average value of the luminance in the target region RD of the present frame I1, a standard deviation of the luminance in the target region R0 of the present frame I1, an average value of the luminance in each of the divided regions R1 in the present frame I1, and a standard deviation of the luminance in each of the divided regions R1 in the present frame I1 (Step S102).

The extraneous-matter detecting apparatus 1 determines whether or not an average value of the luminance in the target region R0 is equal to or less than the predetermined low-illuminance value (Step S103). When the average value of the luminance in the target region R0 is equal to or less than the predetermined low-illuminance value (Step S103: Yes), the extraneous-matter detecting apparatus 1 determines whether or not a vehicle speed is equal to or more than the predetermined low-vehicle speed (Step 104).

When a vehicle speed is equal to or more than the predetermined low-vehicle speed (Step S104: Yes), the extraneous-matter detecting apparatus 1 sets a transition state to the fifth state (Step S105). Specifically, in the fifth state, the extraneous-matter detecting apparatus 1 does not execute an adhesion determination in the extraneous matter M and holds a counter value, or sets the counter value to a predetermined fixed value. In the fifth state, the extraneous-matter detecting apparatus 1 turns "OFF" the extraneous-matter detecting flag, and further turns ON the low-illuminance flag.

When a vehicle speed is smaller than the predetermined low-vehicle speed (Step S104: No), the extraneous-matter detecting apparatus 1 sets a transition state to the fourth state (Step S106). Specifically, in the fourth state, the extraneous-matter detecting apparatus 1 does not execute an adhesion determination of the extraneous matter M, holds a counter value, turns "OFF" the extraneous-matter detecting flag, and further turns "ON" the low-illuminance flag.

When an average value of the luminance in the target region R0 is higher than the predetermined low-illuminance value (Step S103: No), the extraneous-matter detecting apparatus 1 determines whether or not a vehicle speed is equal to or more than the predetermined low-vehicle speed (Step S107). When a vehicle speed is smaller than the predetermined low-vehicle speed (Step S107: No), the extraneous-matter detecting apparatus 1 sets a transition state to the second state (Step S108). Specifically, in the second state, the extraneous-matter detecting apparatus 1 executes an adhesion determination of the extraneous matter M.

When a vehicle speed is equal to or more than the predetermined low-vehicle speed (Step S107: Yes), the extraneous-matter detecting apparatus 1 determines whether or not the vehicle speed is equal to or less than the predetermined high-vehicle speed (Step S109).

When a vehicle speed is equal to or less than the predetermined high-vehicle speed (Step S109: Yes), the extraneous-matter detecting apparatus 1 sets a transition state to the first state (Step S110). Specifically, in the first state, the extraneous-matter detecting apparatus 1 executes an adhesion determination of the extraneous matter M.

When a vehicle speed is larger than the predetermined high-vehicle speed (Step S109: No), the extraneous-matter detecting apparatus 1 sets a transition state to the third state (Step S111). Specifically, in the third state, the extraneous-matter detecting apparatus 1 does not execute an adhesion determination of the extraneous matter M, holds a counter value, and further holds the extraneous-matter detecting flag.

Figure 5:
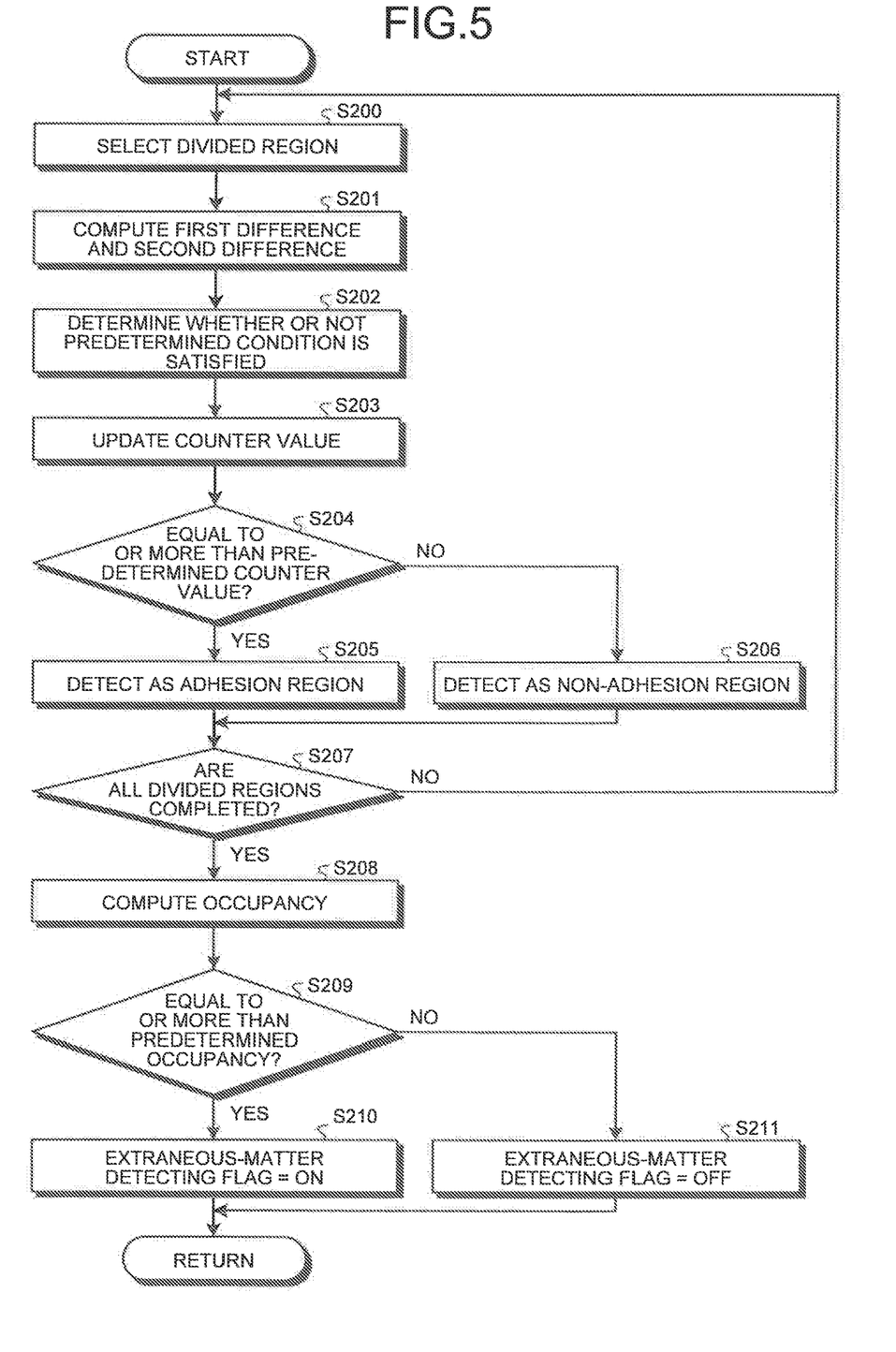
FIG. 5 is a flowchart illustrating an adhesion determining process.

Next, the adhesion determining process according to the embodiment will be explained with reference to FIG. 5. FIG. 5 is a flowchart illustrating the adhesion determining process. The adhesion determining process is executed when a transition state is the first state or the second state.

The extraneous-matter detecting apparatus 1 selects the divided region R1 (Step S200). Specifically, the extraneous-matter detecting apparatus 1 selects, from among the divided regions R1 of the present frame I1, the divided region R1 on which the determination of whether or not a predetermined condition is satisfied is not executed.

The extraneous-matter detecting apparatus 1 computes a first difference and a second difference in the selected divided region R1 (Step S201). The extraneous-matter detecting apparatus 1 may have previously computed a first difference and a second difference in each of the divided regions R1, and may read out a first difference and a second difference that are corresponding to the selected divided region R1.

The extraneous-matter detecting apparatus 1 determines whether or not the divided region R1 satisfies a predetermined condition (Step S202). The extraneous-matter detecting apparatus 1 updates a counter value of the divided region R1 on the basis of the determination result (Step S203).

Specifically, when a transition state is the first state and the divided region R1 satisfies a predetermined condition, the extraneous-matter detecting apparatus 1 increases a counter value of the divided region R1. When a transition state is the first state and the divided region R1 does not satisfy the predetermined condition, the extraneous-matter detecting apparatus 1 reduces a counter value of the divided region R1.

When a transition state is the second state and the divided region R1 satisfies a predetermined condition, the extraneous-matter detecting apparatus 1 holds a counter value of the divided region R1. When a transition state is the second state and the divided region R1 does not satisfy the predetermined condition, the extraneous-matter detecting apparatus 1 reduces a counter value of the divided region R1.

The extraneous-matter detecting apparatus 1 determines whether or not a counter value is equal to or more than a predetermined counter value (Step S204). When a counter value is equal to or more than the predetermined counter value (Step S204: Yes), the extraneous-matter detecting apparatus 1 detects the divided region R1 as an adhesion region (Step S205). When a counter value is smaller than the predetermined counter value (Step S204: No), the extraneous-matter detecting apparatus 1 detects the divided region R1 as a non-adhesion region (Step S206).

When determining, for all of the divided regions R1, whether or not a predetermined condition is satisfied (Step S207: Yes), the extraneous-matter detecting apparatus 1 computes an occupancy (Step S200), and further determines whether or not the occupancy is equal to or more than a predetermined occupancy (Step S209). When there presents the divided region R1 on which whether or not the predetermined condition is satisfied has not determined yet (Step S207: No), the extraneous-matter detecting apparatus 1 newly selects the divided region R1 (Step S200), and repeatedly executes the above-mentioned process.

When an occupancy is equal to or more than a predetermined occupancy (Step S209: Yes), the extraneous-matter detecting apparatus 1 turns ON the extraneous-matter detecting flag (Step S210). When an occupancy is smaller than the predetermined occupancy (Step S209: No), the extraneous-matter detecting apparatus 1 turns "OFF" the extraneous-matter detecting flag (Step S211).

The extraneous-matter detecting apparatus 1 sets, on the basis of a vehicle speed and an average value of the luminance in the target region R0, a transition state of information that indicates an adhesion state of the extraneous matter M in the divided region R1.

Thus, the extraneous-matter detecting apparatus 1 is capable of controlling information that indicates an adhesion state of the extraneous matter M in accordance with a traveling state of the vehicle C, so that it is possible to prevent an erroneous determination of the extraneous matter M.

When an average value of the luminance in the target region R0 is equal to or less than the predetermined low-illuminance value, the extraneous-matter detecting apparatus 1 holds a counter value. Specifically, when a transition state is the fourth state or the fifth state, the extraneous-matter detecting apparatus 1 holds a counter value.

Thus, when an extraneous matter has adhered to a lens of the on-vehicle camera 10 and a transition state is changed from the fourth state or the fifth state into the first state or the second state, the extraneous-matter detecting apparatus 1 is capable of turning ON the extraneous-matter detecting flag in an early stage.

When a state, in which a counter value is larger than a predetermined counter value and an average value of the luminance in the target region R0 is larger than the predetermined low-illuminance value, is changed into a state, in which a vehicle speed is equal to or more than the predetermined low-vehicle speed and an average value of the luminance in the target region R0 is equal to or less than the predetermined low-illuminance value, the extraneous-matter detecting apparatus 1 sets a counter value to a predetermined fixed value. Specifically, when a transition state is changed from the first state into the fifth state, for example, and a counter value is equal to or more than a predetermined counter value in the first state, the extraneous-matter detecting apparatus 1 sets a counter value to a predetermined fixed value, Thus, for example, when the vehicle C is travelling in a tunnel in a state where the extraneous matter M has adhered to a lens of the on-vehicle camera 10, the extraneous-matter detecting apparatus 1 is capable of preventing the extraneous-matter detecting flag from hunching. Moreover, the extraneous-matter detecting apparatus 1 is capable of turning "ON" the extraneous-matter detecting flag in an early stage when the vehicle C goes out of a tunnel in a state where the extraneous matter M has adhered, for example.

When a vehicle speed is equal to or more than the predetermined low-vehicle speed, the vehicle speed is equal to or less than the predetermined high-vehicle speed, and an average value of the luminance in the target region R0 is larger than the predetermined low-illuminance value, the extraneous-matter detecting apparatus 1 increases or decreases a counter value. Specifically, when a transition state is the first state, the extraneous-matter detecting apparatus 1 increases or decreases a counter value.

Thus, when an adhesion state of the extraneous matter M to a lens of the on-vehicle camera 10 is able to be precisely determined, the extraneous-matter detecting apparatus 1 executes an adhesion determination of the extraneous matter M. Thus, the extraneous-matter detecting apparatus 1 is capable of precisely detecting adhesion of the extraneous matter M.

When a vehicle speed is smaller than the predetermined low-vehicle speed and an average value of the luminance in the target region R0 is larger than the predetermined low-illuminance value, the extraneous-matter detecting apparatus 1 holds or reduces a counter value. Specifically, when a transition state is the second state, the extraneous-matter detecting apparatus 1 is capable of only reducing a counter value.

Thus, the extraneous-matter detecting apparatus 1 prevents execution of an adhesion determination of the extraneous matter M based on the captured image I that is captured at a low vehicle speed and has a small first difference, so that it is possible to prevent an erroneous determination of the extraneous matter M. For example, when the extraneous matter M is wiped away, the extraneous-matter detecting apparatus 1 is capable of detecting removal of the extraneous matter M.

When a vehicle speed is larger than a predetermined vehicle speed and an average value of the luminance in the target region R0 is larger than the predetermined low-illuminance value, the extraneous-matter detecting apparatus 1 holds a counter value. Specifically, when a transition state is the third state, the extraneous-matter detecting apparatus 1 holds a counter value.

Thus, the extraneous-matter detecting apparatus 1 prevents execution of an adhesion determination of the extraneous matter M based on the captured image I that is captured at a high vehicle speed and has a large blur, so that it is possible to prevent an erroneous determination of the extraneous matter M.

In a case where an average value of the luminance in the target region R0 is equal to or less than the predetermined low-illuminance value, the extraneous-matter detecting apparatus 1 turns "OFF" an adhesion detecting flag. Specifically, in a case where a transition state is the fourth state or the fifth state, the extraneous-matter detecting apparatus 1 turns "OFF" an adhesion detecting flag.

Thus, the extraneous-matter detecting apparatus 1 is capable of preventing turning "ON" of the extraneous-matter detecting flag when adhesion of the extraneous matter M is not able to be precisely executed, and is further capable of transmitting precise information to the various devices 50.

In the extraneous-matter detecting apparatus 1 according to a modification, the predetermined low-illuminance value, the predetermined low-vehicle speed, etc. may be set for each of the on-vehicle cameras 10.

According to one aspect of an embodiment, it is possible to reduce erroneous determination of an extraneous matter.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An extraneous-matter detecting apparatus comprising:
    a processor configured to:
        set, for a captured image captured by an image capturing device provided in a vehicle, a plurality of divided regions;
        compute a representative value of luminance in a target region for detecting an adhesion of an extraneous matter, the target region including the plurality of divided regions;
    set, based on a vehicle speed and the representative value of luminance in the target region, a transition state of information that indicates an adhesion state of an extraneous matter in the divided region;
        compute, in the information, a counter value that indicates adhesion continuity of the extraneous matter;
        hold the counter value when the transition state is a state in which the representative value of luminance in the target region is equal to or less than a predetermined low-illuminance value; and
        set the counter value to a predetermined fixed value, when the counter value is larger than the predetermined fixed value, and the transition state is changed from a state where the representative value of luminance in the target region is larger than the predetermined low-illuminance value into a state where the vehicle speed is equal to or more than a predetermined low-vehicle speed and the representative value of luminance in the target region is equal to or less than the predetermined low-illuminance value.

2. The extraneous-matter detecting apparatus according to claim 1, wherein the processor is further configured to
    compute, as the representative value of luminance, an average value of luminance in the target region.

3. The extraneous-matter detecting apparatus according to claim 1, wherein
    processor is further configured to:
    increase or decrease the counter value, when the transition state is a state where the vehicle speed is equal to or more than a predetermined low-vehicle speed, the vehicle speed is equal to or less than a predetermined high-vehicle speed, and the representative value of luminance in the target region is larger than the predetermined low-illuminance value.

4. The extraneous-matter detecting apparatus according to claim 1, wherein
    the processor is further configured to:
    hold or reduce the counter value, when the transition state is a state where the vehicle speed is smaller than a predetermined low-vehicle speed, and the representative value of luminance in the target region is larger than the predetermined low-illuminance value.

5. The extraneous-matter detecting apparatus according to claim 1, wherein
the processor is further configured to:
hold the counter value, when the transition state is a state where the vehicle speed is larger than a predetermined high-vehicle speed, and the representative value of luminance in the target region is larger than the predetermined low-illuminance value.

6. An extraneous-matter detecting apparatus comprising:
a processor configured to:
set, for a captured image captured by an image capturing device provided in a vehicle, a plurality of divided regions;
compute a representative value of luminance in a target region for detecting an adhesion of an extraneous matter, the target region including the plurality of divided regions;
set, based on a vehicle speed and the representative value of luminance in the target region, a transition state of information that indicates an adhesion state of an extraneous matter in the divided region; and
turn OFF, in the information, a flag indicating that the extraneous matter has adhered in the target region, when the transition state is a state where the representative value of luminance in the target region is equal to or less than a predetermined low-illuminance value.

7. An extraneous-matter detecting method comprising:
setting, for a captured image captured by an image capturing device provided in a vehicle, a plurality of divided regions;
computing a representative value of luminance in a target region for detecting an adhesion of an extraneous matter, the target region including the plurality of divided regions;
setting, based on a vehicle speed and the representative value of luminance in the target region, a transition state of information that indicates an adhesion state of an extraneous matter in the divided region;
computing, in the information, a counter value that indicates adhesion continuity of the extraneous matter;
holding the counter value when the transition state is a state in which the representative value of luminance in the target region is equal to or less than a predetermined low-illuminance value; and
setting the counter value to a predetermined fixed value, when the counter value is larger than the predetermined fixed value, and the transition state is changed from a state where the representative value of luminance in the target region is larger than the predetermined low-illuminance value into a state where the vehicle speed is equal to or more than a predetermined low-vehicle speed and the representative value of luminance in the target region is equal to or less than the predetermined low-illuminance value.

* * * * *